US010773768B2

(12) United States Patent
Berendzen et al.

(10) Patent No.: US 10,773,768 B2
(45) Date of Patent: Sep. 15, 2020

(54) SYSTEMS AND METHODS FOR AN ATTACHMENT FOR A TRANSPORTATION DEVICE

(71) Applicants: Cory Berendzen, Austin, TX (US); Nicholas Albert, North Hollywood, CA (US); Lawrence An, Arlington, VA (US)

(72) Inventors: Cory Berendzen, Austin, TX (US); Nicholas Albert, North Hollywood, CA (US); Lawrence An, Arlington, VA (US)

( * ) Notice: Subject to any disclaimer, the term of this patent is extended or adjusted under 35 U.S.C. 154(b) by 210 days.

(21) Appl. No.: 16/137,855

(22) Filed: Sep. 21, 2018

(65) Prior Publication Data

US 2019/0084605 A1    Mar. 21, 2019

Related U.S. Application Data

(60) Provisional application No. 62/561,297, filed on Sep. 21, 2017.

(51) Int. Cl.
| *B62K 27/12* | (2006.01) |
| *B62B 7/04* | (2006.01) |
| *A63C 17/26* | (2006.01) |
| *A63C 17/00* | (2006.01) |
| *B62B 7/14* | (2006.01) |
| *B62B 5/08* | (2006.01) |
| *A63C 17/01* | (2006.01) |
| *A63C 17/04* | (2006.01) |
| *B62B 9/28* | (2006.01) |

(52) U.S. Cl.
CPC .......... *B62K 27/12* (2013.01); *A63C 17/0006* (2013.01); *A63C 17/0033* (2013.01); *A63C 17/014* (2013.01); *A63C 17/04* (2013.01); *A63C 17/26* (2013.01); *B62B 5/087* (2013.01); *B62B 7/042* (2013.01); *B62B 7/142* (2013.01); *B62B 9/28* (2013.01); *A63C 17/016* (2013.01)

(58) Field of Classification Search
CPC ....... B62K 27/12; B62B 5/087; B62B 5/0093; A63C 17/0006
See application file for complete search history.

(56) References Cited

U.S. PATENT DOCUMENTS

| 3,834,726 A | * | 9/1974 | Hobza | ................... B62B 5/0026 |
| | | | | 280/87.041 |
| 6,827,356 B2 | * | 12/2004 | Zhuang | ..................... B62B 9/28 |
| | | | | 280/304.1 |
| 7,581,737 B2 | * | 9/2009 | Cousin | ..................... B62B 9/28 |
| | | | | 280/32.7 |
| 7,699,128 B1 | * | 4/2010 | Strauss | ................. B62B 5/0026 |
| | | | | 180/23 |

(Continued)

*Primary Examiner* — Kevin Hurley
(74) *Attorney, Agent, or Firm* — Pierson Intellectual Property LLC

(57) ABSTRACT

Examples of the present disclosure are related to systems and methods for an attachment for a stroller, walker, wheelchair, ambulation device, or other transportation device. More particularly, embodiments relate to a wheeled board that is configured to be coupled to an axle and a support of the transportation device, wherein a lower clamp connected to the axle is positioned orthogonal to an upper clamp coupled to the support of the transportation device.

13 Claims, 4 Drawing Sheets

(56) References Cited

U.S. PATENT DOCUMENTS

| | | | | |
|---|---|---|---|---|
| 8,029,007 B2* | 10/2011 | Jones | ................ | B62D 63/00 |
| | | | | 280/204 |
| 8,276,922 B2* | 10/2012 | Lai | ................ | B62B 9/28 |
| | | | | 280/32.7 |
| 8,714,582 B2* | 5/2014 | Hei | ................ | B62B 9/28 |
| | | | | 280/47.35 |
| 9,321,475 B2* | 4/2016 | Weber | ................ | B62B 9/28 |
| 9,776,069 B2* | 10/2017 | Mckay | ................ | A63C 17/0006 |
| 2016/0257331 A1* | 9/2016 | Nuske | ................ | B62B 9/28 |
| 2018/0273074 A1* | 9/2018 | Tamez | ................ | A63C 17/0033 |

* cited by examiner

SYSTEMS AND METHODS FOR AN ATTACHMENT FOR A TRANSPORTATION DEVICE

BACKGROUND INFORMATION

Field of the Disclosure

Examples of the present disclosure are related to systems and methods for an attachment for a stroller, grocery cart, wheelchair, walker, ambulation device, or other transportation device. More particularly, embodiments relate to a wheeled board that is configured to be coupled to an axle and a support of the transportation device, wherein a first coupling device connected to the axle is positioned orthogonal to a second coupling device coupled to the support of the transportation device.

Background

Traditionally, strollers are used to push an infant on various surfaces. As parents have become more health conscious, strollers that are able to accommodate faster walking, jogging, running, etc. have become prevalent. These faster moving transportation devices have allowed for wheeled boards to be attached to the back or sides of a stroller.

However, these conventional wheeled board attachments are either behind and between the two wheels of the stroller, or on the sides of the stroller. These placements of the wheeled boards require ample space to allow a first user to stand on the wheeled board and a second user to push the stroller. Further, this placement of conventional wheeled boards directly behind the stroller impedes walking room for the one pushing the stroller. Additionally, positioning wheeled boards on the sides of a stroller causes the stroller to veer, turn, etc. at higher speeds.

Accordingly, needs exist for more effective and efficient systems and methods associated with a wheeled board that is configured to be positioned directly behind a single rear wheel of a transportation device, such as a stroller.

SUMMARY

Embodiments disclosed herein describe systems and methods for coupling a wheeled board directly behind a rear wheel of a transportation device, wherein the wheeled board is configured to rotate upward when not in use. Embodiments may include two, three, or four wheeled boards, wherein independent wheeled boards are positioned directly behind each of the rear wheels of the transportation device, such that a first wheeled board may be rotated in a storage mode while a second wheeled board is rotated to be planar to a ground surface, both wheeled boards may be rotated to be planar to the ground surface, or both wheeled boards may be rotated to be in a storage mode. In embodiments, the wheeled boards may not extend across the entire axle of the transportation device. This may allow a user to walk behind the transportation device without being obstructed by the wheeled boards. Embodiments may include a transportation device, wheeled board, a first arm, and a second arm.

The transportation device may be a stroller, walker, wheelchair, ambulation device, grocery cart, or any other device with an axle extending between rear wheels that assist a user moving from a first location to a second location. In embodiments, the transportation device may include a frame that is configured to couple multiple portions of the transportation device. For example, the frame may include an axle coupling the two rear wheels of the transportations device, wherein a user is able to walk, run, move, etc. when positioned behind the axle. Supports may be coupled to the axle, wherein the supports extend upward away from the axle. A secondary attachment, such as a basket, seat, etc. may be positioned on second ends of the supports.

The wheeled board may include an upper surface and at least one wheel. The upper surface may be a platform where a user may position a foot for stabilization. Then at least one wheel may be coupled to a lower surface of the wheeled board, wherein at least one wheel is configured to touch a ground surface and rotate. In embodiments, a front end of the wheeled board may include a stopper, wherein the stopper is a vertical projection. The stopper may be configured to impede the forward movement of a user's foot.

The first arm may have a lower clamp positioned on a first end of first arm, and a first coupling device positioned on a second end of the first arm. The lower clamp may include a first coupling orifice that extends through a body of the lower clamp. The first coupling orifice may be configured to allow an axle of the transportation device to extend through the first mount, while also providing an axis of rotation for the wheeled board. The first coupling device may be configured to couple the first arm with the wheeled board on a lower surface of the wheeled board. For example, the first coupling device may allow threaded screws to pass through the first coupling device into the wheeled board.

The second arm may have an upper clamp, pivot, and receiver. The upper clamp may be positioned on a first end of the second arm, and may be configured to be coupled with a support of the transportation device. The upper clamp may have a second coupling orifice that is configured to receive the support, and allow the support to pass through the body of the upper clamp. In embodiments, the second coupling orifice may be positioned in a first plane that is orthogonal to a second plane associated with the first coupling orifice. This may allow the upper clamp and the lower clamp to be coupled to the transportation device in multiple and different axis. The pivot may be configured to be positioned on an outer circumference of a wheel of the transportation device, such that the pivot is positioned on a center portion of the wheel. Based on the shape of the second arm, the pivot may be configured to be positioned at centerpoint of wheel. The receiver may be configured to couple the pivot with the lower surface of the wheeled board. For example, the receiver may allow threaded screwed to pass through the receiver into the wheeled board. Through the receiver and the first coupling device, the first side and the second side of the wheeled board may be indirectly coupled to the support and axis of the transportation device, respectively.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
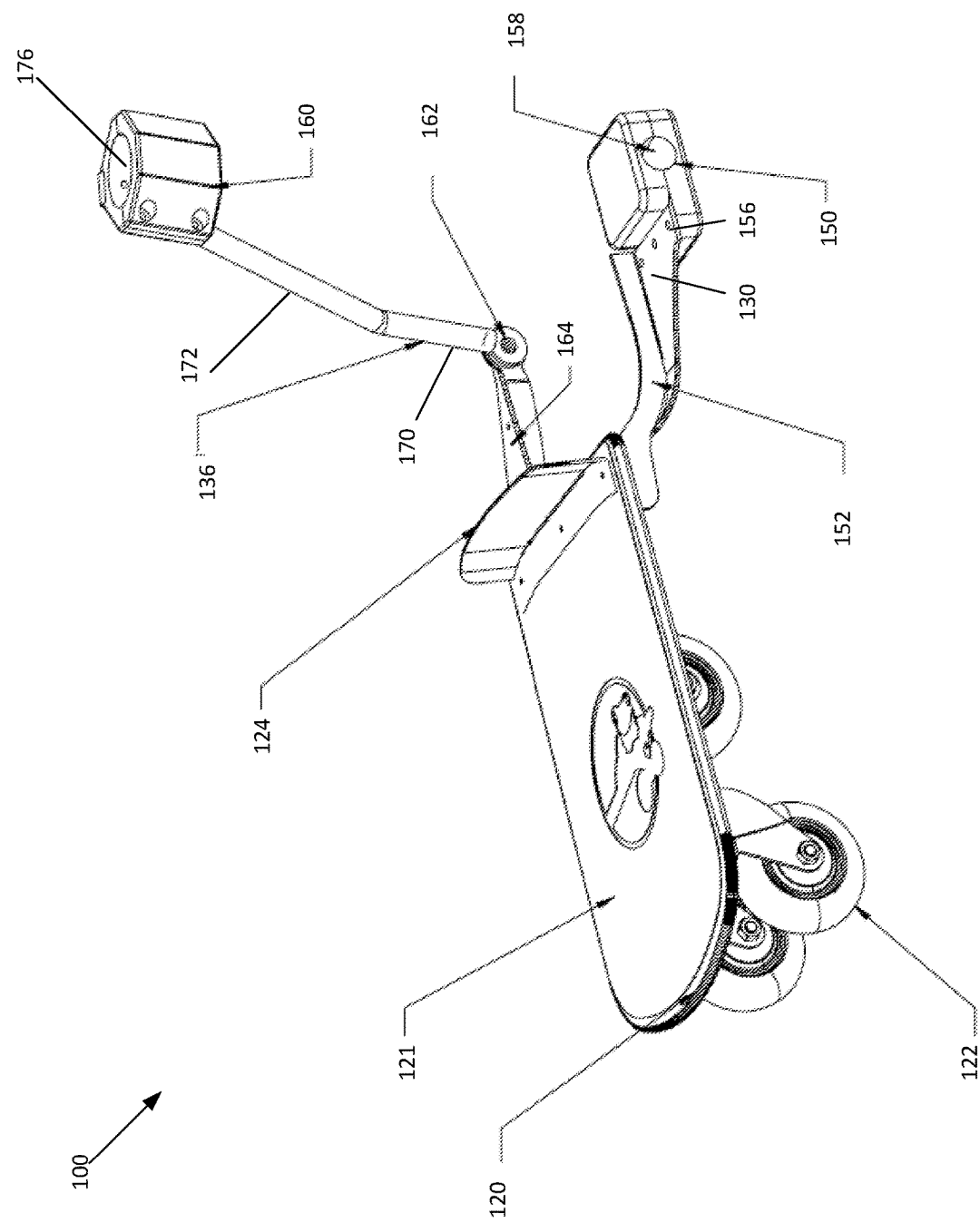
FIG. 1 depicts an attachment system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts a wheeled board attachment system 100 for a transportation device (not shown), according to an embodiment. System 100 may include a transportation device with a wheel, a wheeled board 120, a first arm 130, and a second arm 136.

The transportation device may be a stroller, walker, wheelchair, ambulation device, grocery cart, or any other device with wheels that assists in a user in moving from a first location to a second location. In embodiments, the transportation device may include a frame that is configured to couple multiple portions of the transportation device. For example, the frame includes an axle and support.

The axle may be positioned between two rear wheels of the transportation device. The axle may be positioned in a plane that is perpendicular to the movement of the transportation device, wherein the wheels are positioned at the ends or proximate to the ends of the axle.

The support may be coupled to the axle at a location that is between the wheels. The Support may extend upward away from axle in a plane that is perpendicular to a longitudinal axis of axle, wherein the support may by tangential to axle.

Wheeled board 120 may be a platform where a user may position their feet while in use, and wheeled board 120 may be rotated upward to be stored when not in use. In embodiments, wheeled board 120 may be positioned off center with respect to the wheel. Wheeled board 120 may include an upper surface 121, at least one wheel 122, and kick plate 124.

Upper surface 121 may be configured to receive the feet of the user, such as a small child. Upper surface 121 may have a width that is larger than that of wheel 110, but smaller than that of the axle of the transportation device. As such, upper surface 121 may not be configured to extend across the entire rear surface of the transportation device. In embodiments, upper surface 121 may include grip tape, bumps, grooves, raises, etc. that are configured to receive the feet of the user.

The upper surface 121 may include a toe guard positioned the distal edge of the upper surface and the rear wheel of the transportation device. The toe guard may be a bump, projection, hump, overhang, ledge, etc. that is configured to cover or partially cover the rear wheel of the transportation device. The toe guard may be configured to maintain the feet of the user of the upper surface 121, such that the feet of the user will not interact with the rear wheel of the transportation device.

The at least one wheel 122 may be positioned on a lower surface of wheeled board 120, wherein the wheel 122 may allow wheeled board 120 to move along with the transportation device while providing stabilization for wheeled board 120. In embodiments, wheeled board 120 may include a plurality of wheels on the lower surface of wheeled board.

The kick plate 124 may be a toe guard positioned the distal edge of the upper surface and the rear wheel 110. The kick plate 124 may be a bump, projection, hump, wall, etc. that is configured to extend vertically away from upper surface 121. The toe guard may be configured to maintain the feet of the user of the upper surface 121, such that the feet of the user will not interact with the rear wheel of the transportation device.

First arm 130 may be configured to be coupled to a lower surface of the wheeled board 120 and the axle of the transportation device. First arm 130 may include a lower clamp 150 and first coupling mechanism 152. First arm 130 may have a first end attached to a lower clamp 150, and have a second end attached to first coupling device 134. First arm 130 may be a curved arm, wherein the curve may be a decreasing concave curve. This may be utilized to couple lower clamp 150 to the axle of the transportation device at a position that is below first coupling device 152.

Lower clamp 150 may be device that is configured to allow the axle to extend through a first coupling orifice 158, wherein the first coupling orifice extends through the lower clamp 150. The first coupling orifice 158 may extend in a direction that is in parallel and co-planar to the axle. In embodiments, wheeled board 120 may be configured to rotate around an axis defined by the axle of the transportation device, which is collinear with the first coupling orifice 158 of lower clamp 130. Lower clamp 150 may include a ledge 156 that extends away from a body of the lower clamp 150. The first end of first arm 130 may be configured to be positioned on the ledge and provide a downward force against the ledge 156 when a user is standing on wheeled board 120.

First coupling device 152 may be configured to couple the first arm 130 with the wheeled board on a lower surface of the wheeled board 120 on an inner side of wheeled board 120. For example, the first coupling device may allow threaded screwed to pass through the first coupling device 152 into the wheeled board 120.

Second arm 136 may be configured to couple the support of the transportation device with the wheeled board 120. Second arm 136 may be a curved arm, wherein the curve may be an increasing concave curve, which is also curved towards a central axis of the transportation device. This may be utilized to couple upper clamp 160 to the support at a location that is higher than coupling bar at a location that is aligned with the central axis of the wheeled board 120. Additionally, the curvature of second arm 136 may allow for second arm 136 to curve around the rear wheel of the transportation vehicle. To this end, the wheeled board 120 may be coupled to the transportation device at two different locations, wherein a first location, via first arm 130, is positioned lower than wheeled board 120 and a second location, via second arm 136, is positioned higher than wheeled board 120. Second arm 136 may include upper clamp 160, pivot 162, and receiver 164.

Upper clamp 160 may be configured to be removably coupled to the support, wherein upper clamp 160 may be any coupling device. In embodiments, upper clamp 160 may be the same or a different coupling device than lower clamp 150. For example, upper clamp 160 may include a clamp with a variable diameter, wherein upper clamp 160 is configured to be positioned around the support in an unlocked mode. In a locked mode, upper clamp 160 may be closed to decrease the inner diameter of upper clamp 160. This may allow the inner sidewalls of the inner diameter of upper clamp 160 apply pressure against the support to secure upper clamp 160 in place. In other embodiments, upper clamp 160 may be configured to be affixed to the support via screws, bolts, etc. Upper clamp 160 may have a plurality of joints, wherein a first joint 170 may be configured to extend away from a center point of a wheel of the transportation device, wherein the first joint 170 has a length that is longer than a radius of the wheel. A second joint 172 may extend upward and towards a central axis of the transportation device, such that the second joint 172 has a first end that is positioned outside of the wheel and a second end that is positioned between the two wheels of the transportation device. In embodiments the second joint 172 may be longer than the first joint 170 or the third joint (not shown). The Third joint may extend upward and towards a central axis of the transportation device. In embodiments, an angle of the third joint may be less than an angle of the second joint 172.

In embodiments, upper clamp 160 may have a second coupling orifice 176that is configured to encompass the support in a plane that is perpendicular to plane associated with a longitudinal axis of the first coupling orifice of the lower clamp 130. Furthermore, the longitudinal axis of second upper clamp 160 may be tangential to the longitudinal axis of lower clamp 130. In embodiments, upper clamp 160 may be positioned more proximate to a front end of transportation device than lower clamp 130. By coupling wheeled board 120 to the transportation device in different horizontal, vertical, and lateral axis via upper clamp 160 and lower clamp 130, wheeled board 120 may be more stable and be configured to move in the same direction as the transportation device without swaying.

Pivot 162 may be configured to be positioned between receiver 164 and upper clamp 160. Pivot 162 may be configured to be positioned on an outer circumference of a wheel of the transportation device, such that Pivot 162 is positioned on a center portion of the wheel. Based on the shape of the second arm, Pivot 162 may be configured to apply an inward, compressive force against a body of the wheel. In embodiments, pivot 162 may be offset in multiple axes from the first attachment orifice of lower clamp 150.

Receiver 164 may be configured to couple the pivot with the lower surface of the wheeled board 120. For example, Receiver 164 may allow threaded screwed to pass through the receiver into the wheeled board. Through Receiver 164 and the first coupling device 132, the first side and the second side of the wheeled board 120 may be indirectly coupled to the support and axis of the transportation device, respectively.

By rotating wheeled board 120 about an axis, wheeled board 120 may be stored over a rear wheel 110 of the transportation device when not in use.

Figure 2:
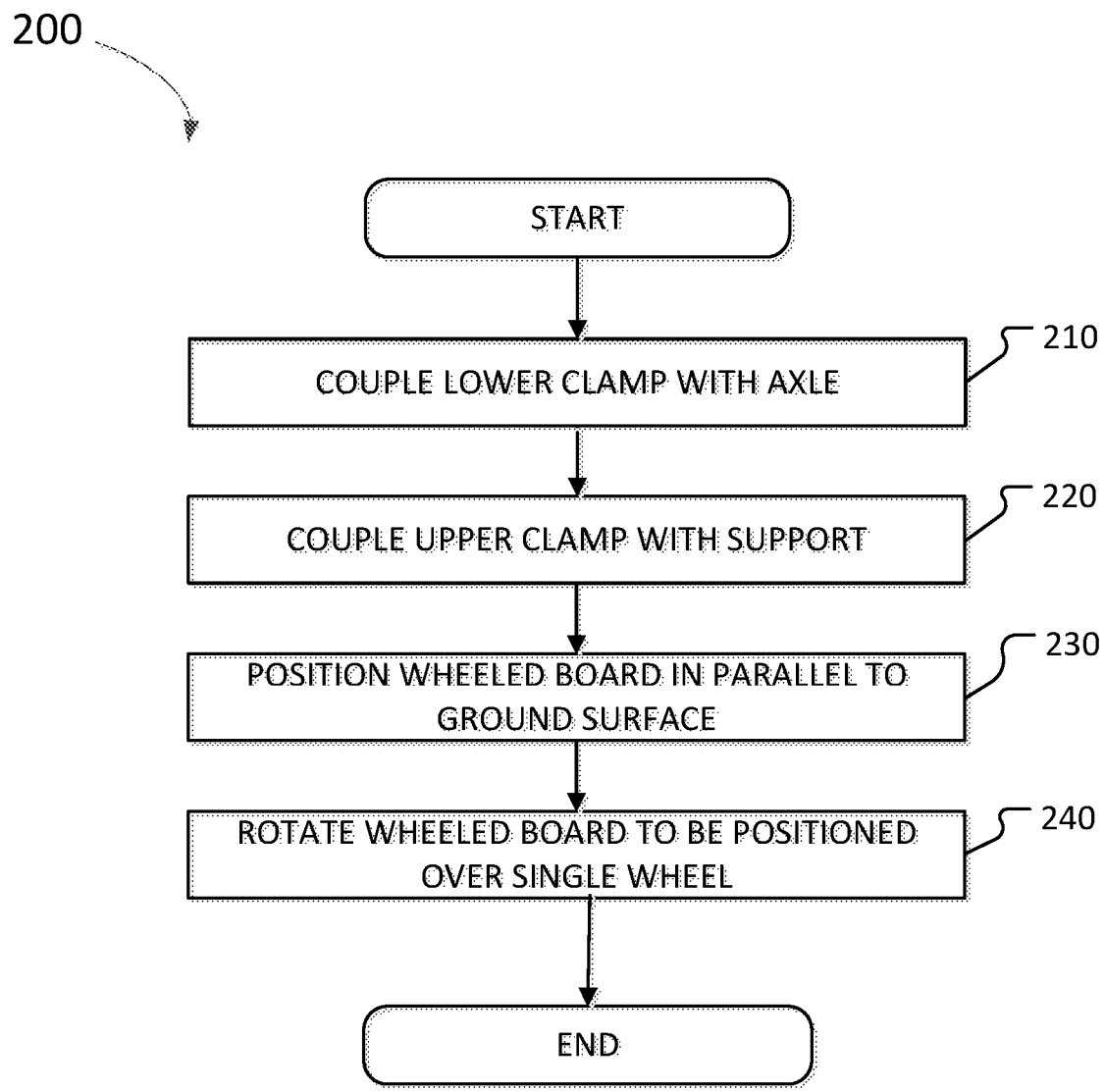
FIG. 2 depicts method of using an attachment system, according to an embodiment.

FIG. 2 depicts a method 200 for utilizing a wheeled board configured to be positioned behind a single rear wheel of a transportation device, wherein the wheeled board does not extend across an entire rear axle of the transportation device, according to an embodiment. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

At operation 210, a lower clamp of positioned on a first end of first arm may be coupled to a rear axle of a transportation device. Further, a second end of the first arm may be coupled to a first side of a wheeled board.

At operation 220, an upper clamp positioned on a first end of a second arm may be coupled to a support of the transportation device. Further, a second end of the first arm may be coupled to a second side of the wheeled board. In embodiments, a first end of the support may be attached to the rear axle or a wheel base of the transportation device, and extend upward away from the ground surface. The second end of the support may be configured to hold a seat, basket, etc.

At operation 230, the wheeled board that is coupled to the first arm and the second arm may be rotated downward from a storage mode to a usage mode. In the usage mode, a wheel associated the wheeled board is positioned on a ground surface. When the wheeled board is rotated downward, the board may be positioned directly behind a rear wheel of the transportation device. When in the usage mode, the wheeled board may be laterally offset from the rear wheel of the transportation device, wherein more or less of the wheeled board is positioned outside of the rear wheel than positioned between the rear wheel.

At operation 240, the wheeled board may be rotated upward from the usage mode to the storage mode. In the storage mode, the wheel associated with the wheeled board is no longer touching the ground surface. Furthermore, by rotating the wheeled board upward the length of the transportation device may be decreased.

Figure 3:
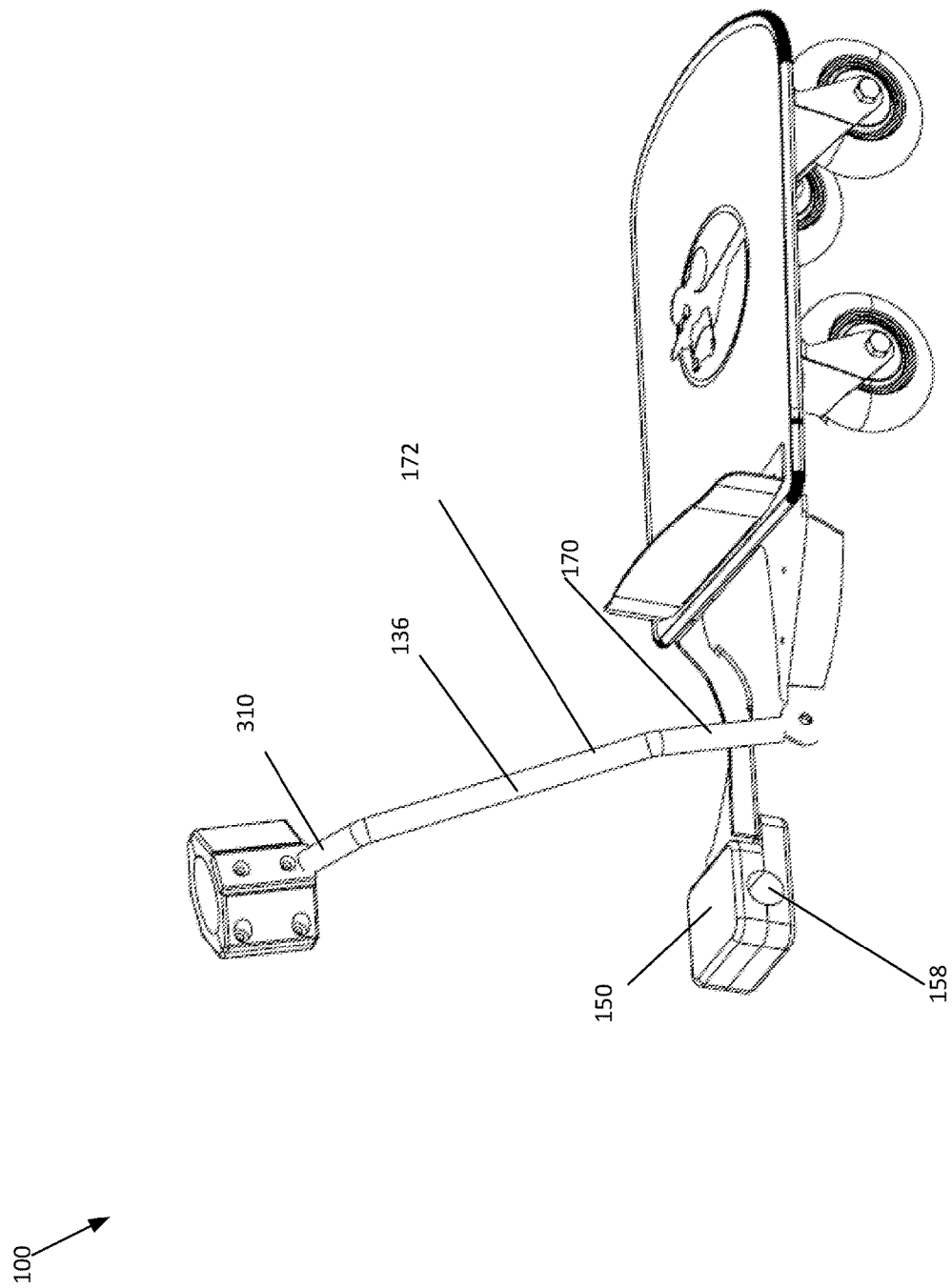
FIG. 3 depicts an attachment system, according to an embodiment.

FIG. 3 depicts attachment system 100, according to an embodiment. Elements depicted in FIG. 3 may be described above. For the sake of brevity, a further description of these elements is omitted.

As depicted in FIG. 3, attachment orifice 158 may extend from a first side of lower clamp 150 to a second side of lower clamp 150. This may allow an axle of the transportation device to extend through the entirety of lower clamp, and be encompassed by attachment orifice 158.

As further depicted in FIG. 3, second arm 136 may have third joint 310. Third joint 310 may be shorter in length than first joint 170 or second joint 172, and may be upwardly an inwardly angled. In embodiments, the angle of third joint 310 may be less sharp than the angle of second joint 172.

Figure 4:
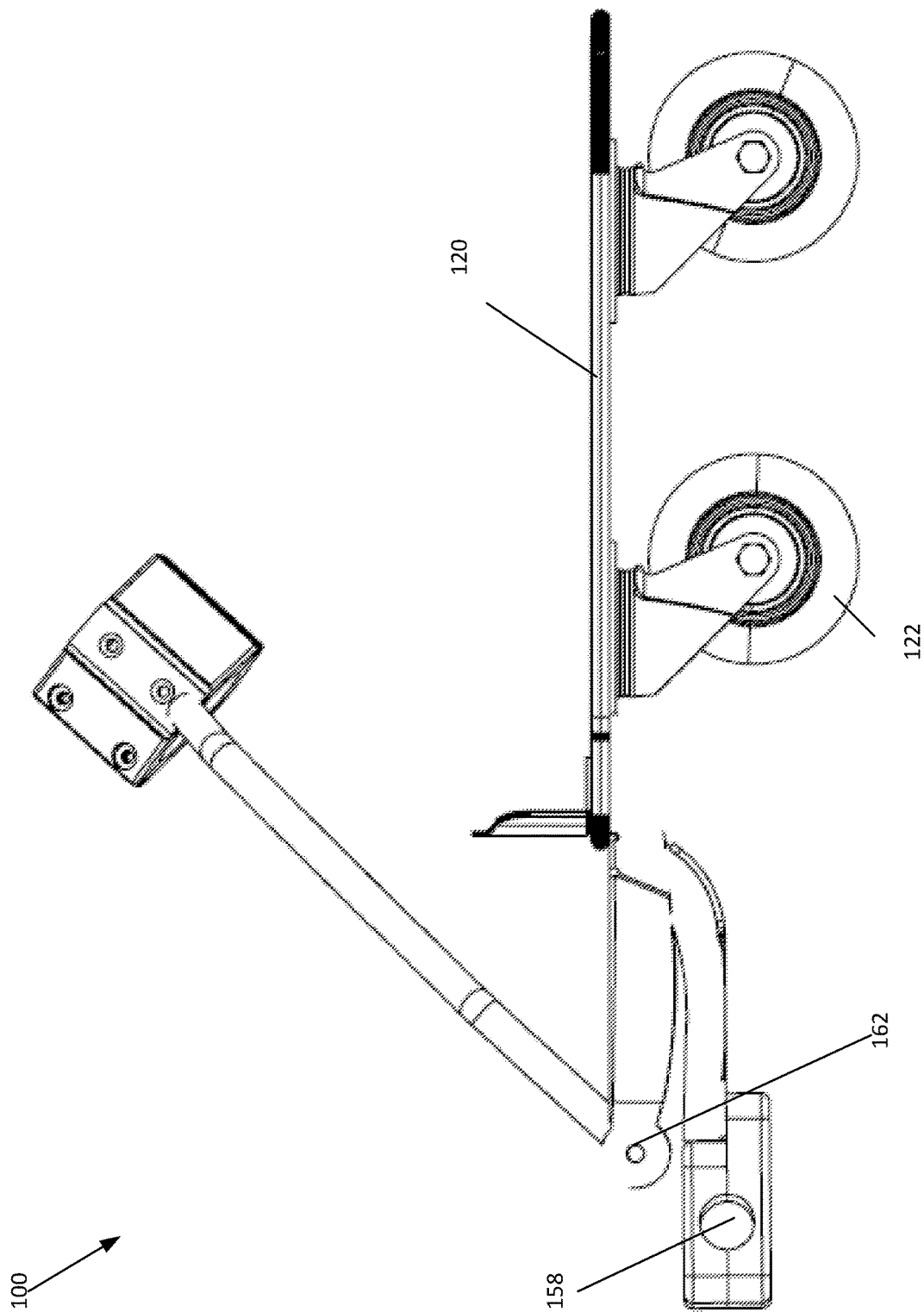
FIG. 4 depicts an attachment system, according to an embodiment.

FIG. 4 depicts a side view of attachment system 100, according to an embodiment. Elements depicted in FIG. 4 may be described above. For the sake of brevity, a further description of these elements is omitted.

As depicted in FIG. 4, the wheels 122 of wheeled board 120 are configured to be positioned level with a ground surface. In embodiments, when wheels 122 are on the ground surface first attachment orifice 158 may be misaligned, vertically, longitudinally, and laterally from pivot 162. This may allow attachment system 100 to be coupled to the transportation device in multiple points in different axis and planes, which may allow for a more stable and smooth ride.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. An attachment system associated with a transportation device comprising:
    a first arm having a lower clamp, the lower clamp having a lower clamp orifice to receive an axle of the transportation device;
    a second arm with an upper clamp, the upper clamp having an upper clamp orifice to receive a support of the transportation device, wherein a first longitudinal axis of the upper clamp orifice is positioned in a first plane that is always orthogonal to a second plane of a second longitudinal axis of the lower clamp orifice when the lower clamp orifice receives the axle and the upper clamp orifice receives the support;
    a board configured to be coupled with a first end of the first arm and a first end of the second arm, wherein the first longitudinal axis of the upper clamp is positioned in-between planes associated with a first side of the board and a second side of the board.

2. The system of claim 1, further comprising:
    an attachment orifice extending through the lower clamp, wherein the axle is configured to extend through the attachment orifice, wherein the board is configured to rotate about an axis defined by the attachment orifice.

3. The system of claim 1, wherein a lower surface of the board includes board wheels, wherein the board wheels have a different circumference than the two wheels of the transportation device.

4. The system of claim 3, wherein the board wheels are positioned proximate to a rear end of the board.

5. The system of claim 1, wherein the first arm has a decreasing concave curve.

6. The system of claim 5, wherein the second arm has an increasing concave curve.

7. The system of claim 6, wherein the first arm is configured to be coupled to the axle at a different vertical offset from where the second arm is coupled with the support.

8. The system of claim 1, wherein the board is not symmetrically aligned with a first wheel of the two wheels.

9. The system of claim 1, wherein the wheels of the transportation device are rear wheels of the transportation device.

10. A system for an attachment system associated with transportation device comprising:
    a first arm having a lower clamp, the lower clamp having a lower clamp orifice configured to receive an axle of the transportation device;
    a second arm with an upper clamp, the upper clamp having an upper clamp orifice being configured to a support of the transportation device;
    a board configured to be coupled with a first end of the first arm and a first end of the second arm, wherein a first longitudinal axis of the upper clamp is positioned in-between planes associated with a first side of the board and a second side of the board, wherein the upper clamp and the lower clamp are shaped differently.

11. The system of claim 1, wherein the axle and the support are part of a frame of the transportation device.

12. The system of claim 1, wherein the second arm includes a pivot, the pivot being configured to be positioned adjacent to an outer surface of a first wheel of the two wheels of the transportation device.

13. A system for an attachment system associated with transportation device comprising:
    a first arm having a lower clamp, the lower clamp having a lower clamp orifice configured to receive of the transportation device;
    a second arm with an upper clamp, the upper clamp having an upper clamp orifice being configured to a support of the transportation device;
    a board configured to be coupled with a first end of the first arm and a first end of the second arm, wherein a first longitudinal axis of the upper clamp is positioned in-between planes associated with a first side of the board and a second side of the board, wherein the board includes a kick plate, the kick plate being a vertical projection positioned proximate to a front end of the board.

* * * * *